United States Patent [11] 3,586,444

| | | | |
|---|---|---|---|
| [72] | Inventors | Merrill F. Sproul<br>Sturbridge;<br>Richard D. Courtemanche, Southbridge,<br>both of, Mass. | |
| [21] | Appl. No. | 7,134 | |
| [22] | Filed | Jan. 30, 1970 | |
| [45] | Patented | June 22, 1971 | |
| [73] | Assignee | American Optical Corporation<br>Southbridge, Mass. | |

[54] STRIAESCOPE FOR INSPECTING A TRANSPARENT OBJECT SUBMERGED IN A LIQUID HAVING THE SAME INDEX OF REFRACTION
4 Claims, 3 Drawing Figs.

[52] U.S. Cl. .................................................. 356/129, 356/239
[51] Int. Cl. .................................................. G01n 21/16, G01n 21/46
[50] Field of Search .......................................... 356/30, 129, 198, 201, 239, 240

[56] References Cited
UNITED STATES PATENTS
2,869,417  1/1959  Allen ............................ 356/30
3,302,786  2/1967  Conrad ....................... 209/111.5

Primary Examiner—Ronald L. Wibert
Assistant Examiner—Orville B. Chew, II
Attorneys—William C. Nealon, Noble S. Williams and Robert J. Bird ABSTRACT: A device for photographically recording the location and amount of striae, cracks and inclusions in long rods of glass. A rod of glass placed in an immersion liquid having an index of refraction matching that of the rod is scanned from one end to another thereof by a slit of high intensity collimated light directed into the rod perpendicularly to its axis and a strip of photographic film extending along the length of the rod is exposed by portions of the scanning light transmitted through the rod whereby a shadowgraphic recording of the striae, cracks and/or inclusions is produced upon the film.

INVENTORS
MERRILL F. SPROUL
RICHARD D. COURTEMANCHE
BY
Noble J. Williams
ATTORNEY 3,586,444

STRIAESCOPE FOR INSPECTING A TRANSPARENT OBJECT SUBMERGED IN A LIQUID HAVING THE SAME INDEX OF REFRACTION

BACKGROUND OF THE INVENTION

1. Field of the Invention

Shadowgraphy with particular reference to a striaescope for producing shadowgraphic recordings of striae, cracks and/or inclusions in long glass rods.

2. Description of the Prior Art

When glass laser devices reached realistic engineering stages, the first awareness of a need for quality control of the laser glass emerged. At first, the quality examination procedure followed traditional visual examination used in glass plants supplemented by research level experimental work which rated quality as a function of performance of the glass. This form of quality examination sufficed as long as the early high demand for glass of almost any quality kept striae level tolerances high and improvements in glass production processing kept pace with the tolerances in quality.

The eventual need for more stringent quality control, however, involved the use of axial shadowgraphic examination of the glass rods which was not particularly successful. The accumulated effect of even slight striae along the path length of a rod rendered it extremely difficult to determine the extent and exact location of the striae and/or inclusions in the rod.

In view of current needs to determine the extent and precise location of striae, inclusions and/or other defects in rods of laser glass, for example, so that the rods may be selectively cut, ground, cored or otherwise shaped for most efficient use of the clear material thereof, it has been determined that lateral shadowgraphy is the most reliable approach to the problem.

Conventional lateral shadowgraphic techniques, however, are of little usefulness in the examination of glass billets of lengths now used in the manufacture of laser rods and the like. These billets being in the order of 125 or more centimeters in length are required to be at such a distance from the source of illumination that uniformity of the illumination over the full length of the billet requires prohibitably long film exposure times. Furthermore, the use of successive shadowgraphs of short sections of the length of a long glass billet or rod fails to produce reliable results because of cyclic distortion of the overall image resulting from biaxial divergence of point source light. Still further, the problems involved in attempting to produce uniformity of successive exposures prohibit, for all practical purposes, the use of successive shadowgraphs.

This invention, in dealing with the aforementioned problems and difficulties in laterally shadowgraphing billets or rods of glass, makes it possible to produce substantially distortion-free and uniformly exposed photographic shadowgraphs of the entire lengths of exceptionally long billets or rods from which reliable accurate determinations of location, sizes and amounts of striae and/or inclusions in the rods may be made with exceptional ease, economy and minimal expenditure of time.

SUMMARY OF THE INVENTION

According to the present invention a stationary photographic film is extended along one side of a glass billet or rod to be examined and a traveling slit of collimated light is caused to traverse the length of the rod from one end thereof to its opposite end directing the collimated light perpendicularly to the axis of the rod or billet laterally therethrough onto the stationary film for exposure thereof. The rod or billet is immersed in a fluid having an index of refraction which matches the rod material whereby surface irregularities such as ripples resulting from the chilling effect in extrusion or drawing of the rod or billet are prevented from appearing on the shadowgraph and interferring with the reading and interpretation of the location and extent of striae and/or inclusions shown in the shadowgraph. The shadowgraph so formed is an accurate photographic recording of the size, shape and location of striae and/or glass inclusions wherewith it is made possible to plan a working of the billet which will yield maximum usage of clear (i.e. striae-free and/or inclusion-free) portions thereof by performing cutting, grinding and/or coring operations programmed from a study of the shadowgraph.

Details of the present inventive concept will be more fully understood by reference to the following description when taken in conjunction with the accompanying drawings.

DESCRIPTION OF THE PREFERRED EMBODIMENTS

Figure 1:
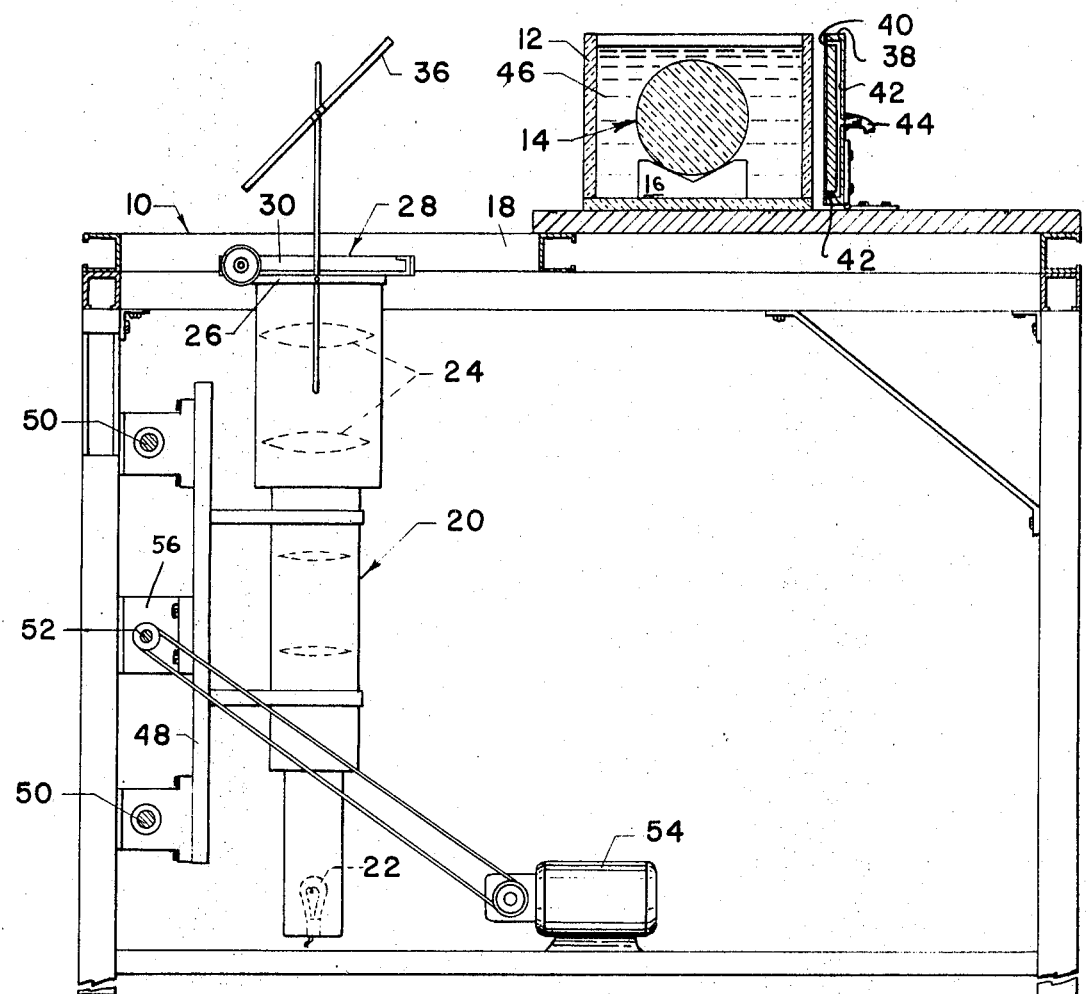
FIG. 1 is a partially cross-sectioned end view of one embodiment of the present invention.
Figure 3:
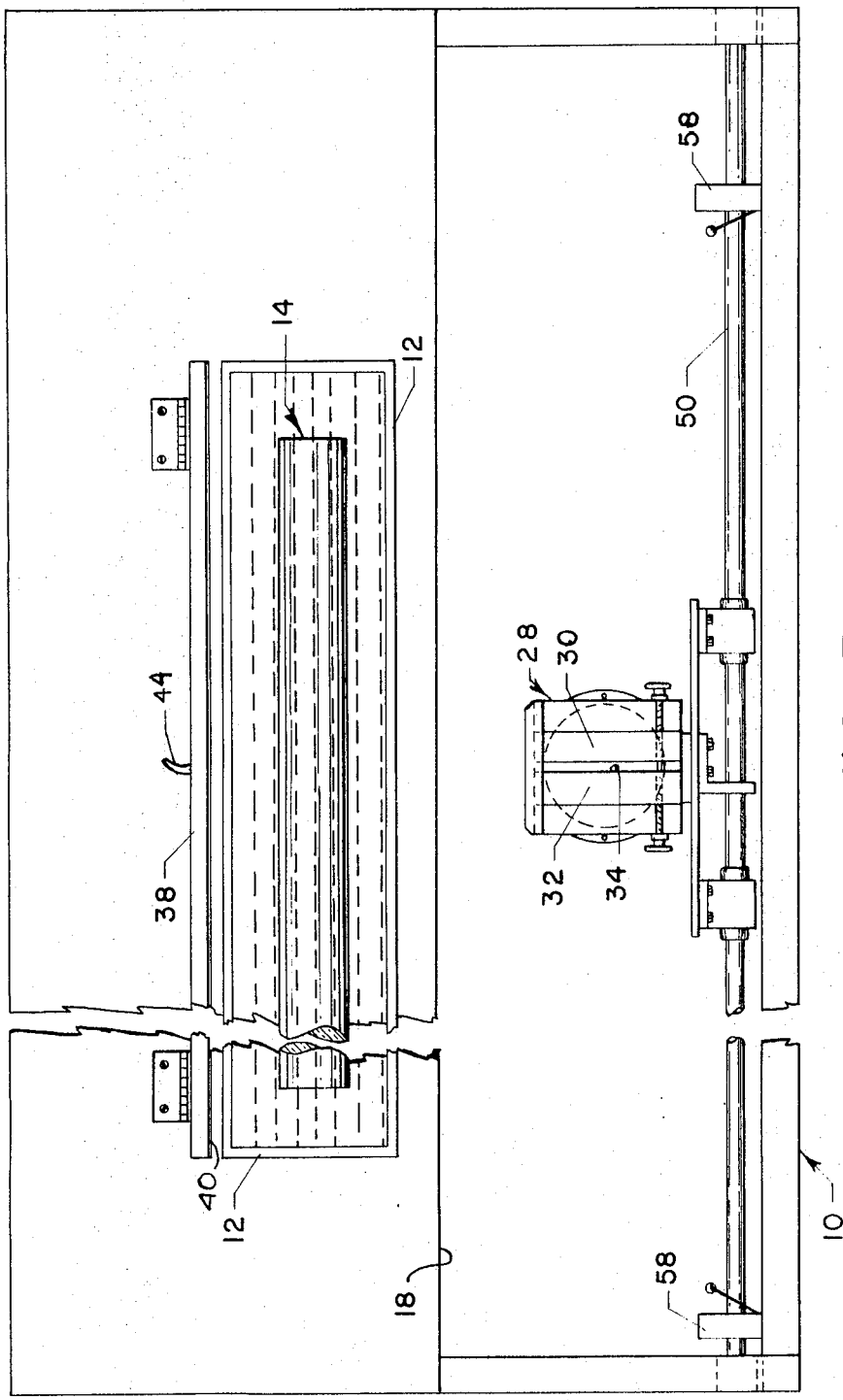
FIG. 3 is a top plan view of the striaescope illustrated in FIG. 1.

Referring more particularly to FIGS. 1 and 3, it will be seen that the striaescope illustrated therein comprises a bench 10 which supports transparent tank 12 within which a long glass rod or billet 14 is placed upon V-blocks 16 for shadowgraphic examination. Depending through an opening 18 in the top of bench 10 is illuminator 20 containing light source 22 preferably in the form of a tungsten arc lamp. Light from source 22 is collimated by lenses 24 and emitted from the uppermost end 26 of illuminator 20. The collimating lens system of illuminator 20 is selected to be such as to have an emitting aperture size which is at least equal to but preferably somewhat larger than the diametral dimension of glass billets such as 14 intended to be examined.

Positioned upon the uppermost end 26 of illuminator 20 is a mask 28 having laterally adjustable opaque pieces 30 and 32 (FIG. 3) forming a slit 34 therebetween through which collimated light from illuminator 20 is emitted. Mirror 36 receives the slit of light emitted by illuminator 20 and directs this light into tank 12 perpendicularly to the axis of billet 14.

Adjacent the side of tank 12 opposite to mirror 36, platen 38 supports photographic film 40 which receives light transmitted laterally through billet 14. Film 40 extends along substantially the full length of tank 12 and is held flatly against platen 38 by a vacuum produced in groove 42 extending along the film receiving face of the platen. A vacuum line 44 connected to a vacuum pump, not shown, produces the vacuum in groove 42. Platen 38 is hinged to bench 10 so as to permit its being swung away from tank 12 when removal and replacement of film 40 is required.

Exposure of film 40 by the slit of light directed through billet 14 produces a shadowgraphic recording of the location, size and amount of internal defects such as striae, cracks and/or inclusions within billet 14 when film 40 is developed by conventional film developing procedures. In order to eliminate the recording of surface irregularities along billet 14, e.g. the usual ripple due to chilling during drawing or extrusion of the billet, tank 12 is filled with an immersion liquid 46 of substantially the same index of refraction as that of the glass of billet 14. In this connection, a billet 14 having an index of refraction of approximately 1.517 may, for example, be immersed in anisole which has the same index of refraction.

In producing a shadowgraphic recording of defects and/or inclusions within billet 14, the slit of light from illuminator 20 is caused to scan the full length of billet 14 from one end to the other thereof at a rate calculated to produce the optimum exposure time for the particular type of film 40 selected for use. The exposure time $t$ is determined from the relationship $t =$ width of slit (in.)/rate of movement (in./min.). Film 40 may be one of any of various commercially available films preferably of the type which may be used under a photographic safe-light condition in a darkened room and requires an exposure time of 1.8 seconds, for example. In shadowgraphing a glass billet 14 of approximately 80 millimeters in diameter and 110 centimeters in length, for example, film 40 would preferably be approximately 100 millimeters wide and supplied or cut into 120 centimeter lengths.

In providing for the scanning of billet 14 by the slit of light from illuminator 20, the illuminator is clamped to a slide 48 which, in turn, is carried by a pair of guide rods 50 extending along the length of bench 10. Lead screw 52 driven by constant speed electric motor 54 is threaded through extension 56 of slide 48 wherewith the slide and illuminator 20 are moved along guide rods 50.

In the operation of photographing a billet 14, the billet is thoroughly cleaned to prevent contamination of the immersion liquid 46 whereupon it is placed in the liquid upon supporting blocks 16. The room is darkened, safe lights are turned on and a length of film 40 is placed on the vacuum platen 38 which is brought into a vertical position adjacent the rearward side of tank 12, as illustrated in FIG. 1. With illuminator 20 positioned adjacent one end of tank 12 and light source 22 energized, motor 54 is started to cause the slit of light from illuminator 20 to traverse the full length of billet 14. Limit switches 58 (FIG. 3) automatically stop motor 54 when the slit of light from illuminator 20 has completely traversed the full length of billet 14.

Motor 54 is preferably of the reversable type making it possible to scan the length of tank 12 first in one direction and then in an opposite direction so as to avoid having to return illuminator 20 to a particular starting point prior to each exposure of a film 40.

Upon the complete exposure of film 40 by a scan of billet 14 from one end to an opposite end thereof by the slit of light, the film is removed from platen 38 and processed by developing, fixing and rinsing in the usual fashion whereby a negative shadowgraphic image of striae, cracks, inclusions and/or other defects in billet 14 appears on the film.

The negative shadowgraphic image of billet 14 is then studied for determining the locations, sizes and extent of striae, cracks or inclusions whereupon various cutting, grinding and/or coring operations are planned for utilizing the clear, striae and inclusion-free, portion of the rod and, in some cases, other portions thereof to best advantage. A photographic print of the film may be made in cases where such may facilitate study of the shadowgraphic image.

Figure 2:
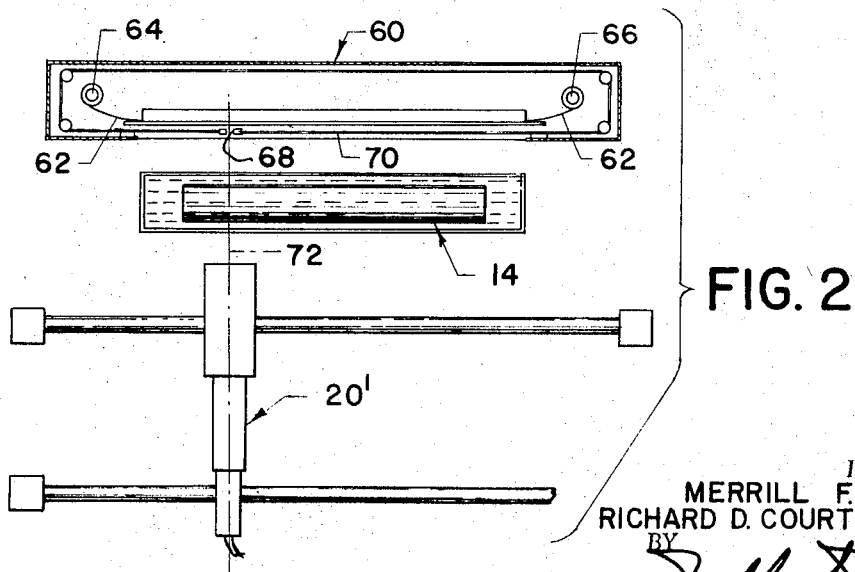
FIG. 2 is a partially cross-sectioned plan view of an alternative embodiment of the invention.

While, as mentioned hereinabove, it may be desirable in most cases to use a photographic film 40 of the well-known type which may be handled under photographic safe lights without a need for complete darkening of a room in which the striaescope is used, it may become necessary in some instances to operate the striaescope under normal lighting conditions and/or to use a highly sensitive film of the type requiring complete darkness during use. Accordingly, the striaescope apparatus described hereinabove may be modified in the manner illustrated in FIG. 2 wherein a light-tight film box 60 replaces the platen shown in FIGS. 1 and 3. Therein, a length of film 62 either in a cassette or extended between spools 64 and 66 is exposed by a traveling slit 68. In this embodiment of the invention, slit 68 is formed in belt 70. It is aligned with axis 72 of illuminator 20' and moved synchronously with the illuminator 20' along the length of film 62 for exposing film 62 to collimated light from illuminator 20' by means of which the shadowgraph of glass billet 14 is produced. Appropriate motor driven belt and pulley or other suitable similar mechanisms are used to move the illuminator 20' and slit 68. Upon the passage of slit 68 beyond either end of the frontal opening 74 in film box 60, the box is rendered light-tight.

We claim:

1. A striaegraph for making shadowgraphic recordings of striae and other defects within long billets of glass, the striaegraph comprising:
   an elongated immersion tank for receiving a glass billet to be examined, said tank having transparent walls and containing an immersion liquid of a refractive index approximately matching the refractive index of the billet;
   a source of collimated light;
   means for directing said collimated light through said tank and a billet placed therein along lines substantially perpendicular to the axis of the billet;
   a holder for receiving and supporting a length of photographic film with the film extended parallel to said axis of the billet and arranged to receive light transmitted through said walls of said tank and billet;
   means for forming a slit of said collimated light on said film; and
   means for moving said slit of light and said billet one relative to the other at a uniform rate so as to expose all sections of the length of said billet to said light for photographically producing a developable shadowgraph of said billet upon said film.

2. A striaegraph according to claim 1 wherein said means for forming said slit of collimated light comprises a pair of opaque light occluding pieces having parallel straight edges adjustable toward and away from each other according to the width desired of said slit of light and said means for moving said slit of light at said uniform rate includes speed control means whereby variations in said rate and width of said slit may be effected for control of the time of exposure of said film in producing said developable shadowgraph of said billet.

3. A striaegraph according to claim 1 wherein said holder for receiving and supporting said length of photographic film comprises a platen, said platen having grooves therein over which said film is extended and further including means for evacuating air and gases from said grooves for holding said film tightly and smoothly against said platen.

4. A striaegraph according to claim 1 wherein said film holder comprises an elongated light-tight box having an elongated frontal opening over which is extended an opaque belt, said belt having a slit extending transversely therethrough for forming said slit of collimated light on said film and means for moving said belt longitudinally of its length along said frontal opening of said box for photographically producing said developable shadowgraph of said billet.